W. O. HAYMOND.
THERMOSTAT.
APPLICATION FILED SEPT. 13, 1915.
1,240,139.
Patented Sept. 11, 1917.
2 SHEETS—SHEET 1.
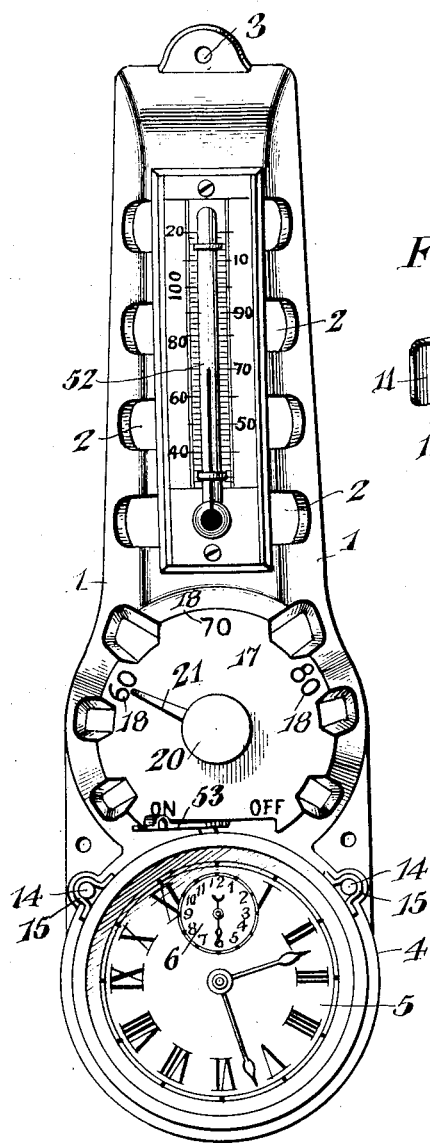
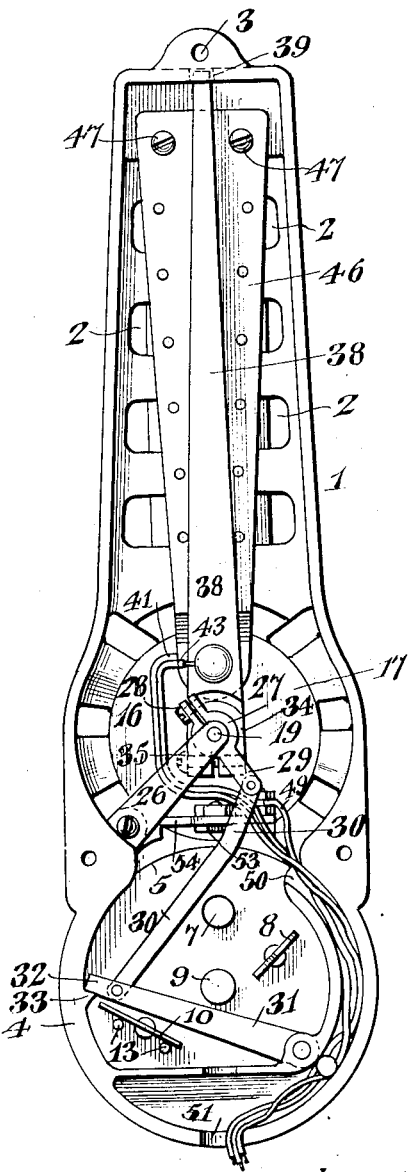
WITNESSES:
Walter O. Haymond, INVENTOR
BY
Attorney

W. O. HAYMOND.
THERMOSTAT.
APPLICATION FILED SEPT. 13, 1915.

1,240,139.

Patented Sept. 11, 1917.
2 SHEETS—SHEET 2.

WITNESSES:
Jas. F. McCathran
F. T. Chapman

Walter O. Haymond, INVENTOR

BY E. G. Siggers

Attorney

UNITED STATES PATENT OFFICE.

WALTER O. HAYMOND, OF MUNCIE, INDIANA.

THERMOSTAT.

1,240,139.  Specification of Letters Patent.  Patented Sept. 11, 1917.

Application filed September 13, 1915. Serial No. 50,473.

*To all whom it may concern:*

Be it known that I, WALTER O. HAYMOND, a citizen of the United States, residing at Muncie, in the county of Delaware and State of Indiana, have invented a new and useful Thermostat, of which the following is a specification.

This invention has reference to thermostats, and its object is to produce a thermostat which may be set to respond to different temperatures and may be readily calibrated so that in the event of the thermostatic element getting out of proper adjustment because of the aging of the materials of which it is composed, the thermostat may be readily recalibrated so that where evenness of temperature is desirable such condition may be maintained indefinitely.

The thermostat of the present invention is designed for use in a heat-controlling structure, such as shown and described in Letters Patent No. 1,137,401, granted to me on April 27, 1915, for electro-mechanical controlling means for fluid supplies, and while the thermostat is particularly adapted to such use, it has a wider extent of use, and, therefore, the invention is not limited to such particular use.

In accordance with the present invention there is provided a thermostatic element which may be of any appropriate construction, but which construction does not enter into the present invention. The thermostatic element controls a contact member movable between other contacts so that when the heat acting upon the thermostatic element reaches a certain degree a circuit is closed, causing the control of a heating fluid, whether the temperature be rising or falling toward the predetermined degree of temperature. The thermostatic element and parts associated therewith are all mounted upon a suitable support which may be placed wherever desired, and because the thermostatic device of the present invention is usually employed in a dwelling, and particularly in living rooms, the device may be of any ornamental configuration. In addition to the thermostatic element and the contacts controlled thereby, the support is provided with a timepiece, a thermometer and certain controlling elements in turn controlled by the timepiece, so that the heating medium may be caused to act at some predetermined time controlled by the timepiece and then any variations in temperature above or below the critical temperature for which the device is adjusted will cause the cutting off of the heating medium or the turning on thereof, as the case may be.

The structure is such that by the adjustment of certain parts for which provision is made, the thermostatic element is readily calibrated with the thermometer with which the structure is provided, and should the thermostatic elements through age or other causes vary from the original calibration they may be recalibrated. By this means the thermostatic element may be made to give good service through an indefinitely long period of time.

The invention will be best understood from a consideration of the following description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a face view of a thermostatic element embodying the present invention.

Fig. 2 is a rear view thereof, with the parts in one position of adjustment.

Fig. 7 is a perspective view of a winding key used in connection with the timepiece.

Figure 4:
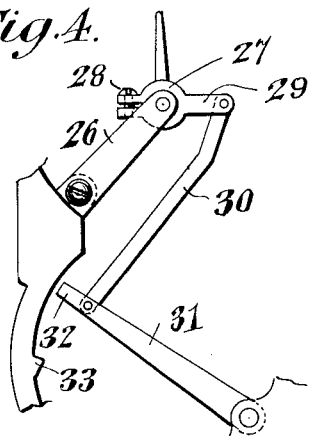
Fig. 4 is a detail view of some of the operating parts in different positions to which they may be moved.
Figure 3:
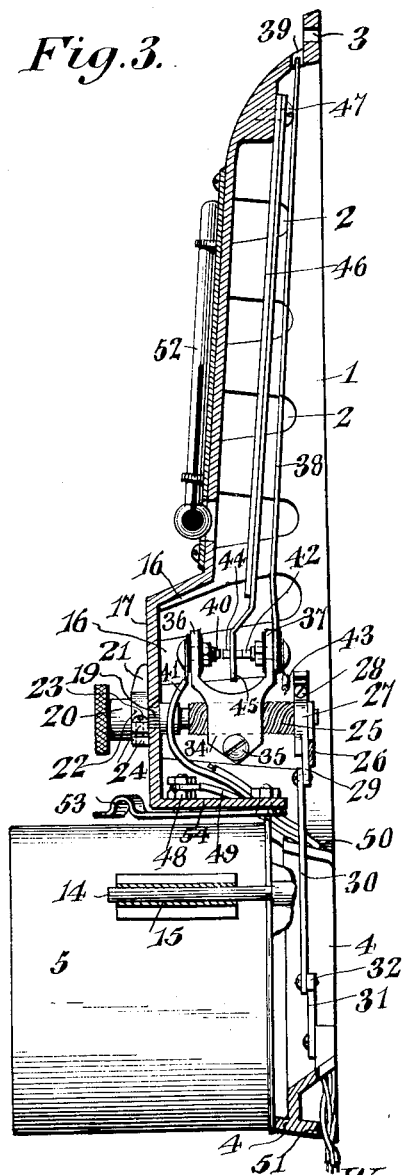
Fig. 3 is a vertical central section from front to rear of the thermostatic element with some parts shown in elevation.
Figure 5:
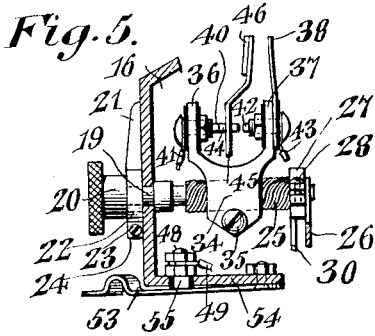
Fig. 5 is a view similar to Fig. 3, but showing a fragment of the structure in somewhat different position of some of the parts.
Figure 6:
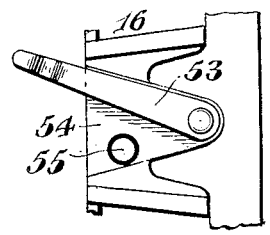
Fig. 6 is a plan view of a switch employed in connection with the thermostat.

Referring to the drawings there is shown an elongated casing 1 preferably of ornamental configuration, and having its walls provided with numerous passages 2, so that air may readily find access to the interior of the casing.

Since in the installed position the casing is customarily placed upright, different parts of the structure will be referred to as to their positions with respect to the installed condition of the structure.

At the upper end of the structure there is an eye 3 by means of which the device may be supported, and at the bottom of the support or casing it is expanded into ring-shape, as indicated at 4, and is there shaped to accommodate certain structures to which reference will hereinafter be made. Adapted to the ring 4 is a timepiece 5 of the type known as an alarm clock. The timepiece or clock is provided with the usual alarm dial 6 and an alarm setting key or knob 7. Besides this the clock has the usual winding key 8, time-setting knob 9, and an alarm winding key 10, this latter key, however, being formed somewhat differently than is customary. The key 10 is shown separately in Fig. 7, the blade of the key indicated at 11 being on one side of the stem of the key expanded toward the clock body, as indicated at 12, and in the path of this extension 12 are stop pins 13 so that the key can make but a partial turn, say, about a half turn. The key extension 12 and the pins 13 are to be taken as indicative of any structure which will limit the winding movements of the key and its movements when the alarm mechanism is released by the time movement.

In order to secure the time movement to the casing or support 1 and to permit the ready removal of the time movement therefrom for winding or other purposes, the ring 4 at appropriate points has rods 14 extending therefrom and adapted to straps 15 on the clock casing, the rods and straps being elongated and matching to securely support the clock and yet permit it to be withdrawn from the ring 4 whenever desired.

Just above the ring 4 the casing is outwardly extended to form a chamber 16 for the accommodation of certain structures, and this chamber has an outer wall 17 above the position occupied by the clock. Upon the outer face of the wall 17 numbers 18 are displayed in suitably spaced relation, these numbers being utilized to indicate certain degrees of temperature. For instance, in the particular showing of the drawings the numbers 60, 70 and 80 are shown, this meaning 60°, 70° and 80° F. in the particular arrangement indicated.

Extending centrally through the wall 17 is a spindle 19 provided with a head 20 exterior to the wall 17, and this head may be suitably milled to facilitate its manipulation. Between the head 20 and the wall 17 the spindle 19 carries a pointer 21 formed where surrounding the spindle into a split collar 22 clamped about the spindle by a screw 23 traversing ears 24 on the collar. By this means the pointer 21 may be set into any desired relation to the spindle about the longitudinal axis of said spindle. Within the chamber 16 the spindle which extends nearly to the rear of the casing, is provided with screw threads 25, and at the end remote from the head 20 the spindle is journaled in an arm 26 made fast to the casing 1 at an appropriate point. Fast to the spindle 19 close to the arm 26 is a split collar 27 held to the spindle by a clamp screw 28, and this collar carries an arm 29 pivoted at the end remote from the spindle to one end of a link 30, which link is pivoted to a rock arm 31 in turn pivoted to an appropriate part of the ring 4 in overlying relation to the back of the clock when in place on the ring 4. The arm 31 terminates at the end remote from its pivoted end in a finger 32 movable into and out of engagement with a lug 33 on the inner wall of the ring 4, this lug determining the travel of the arm 33 in one direction, while the travel of this arm in the other direction is determined by the engagement of the link 30 with the collar 27.

When the arm 31 is in engagement with the lug 33, said arm 31 is in close relation to one wing of the winding key 10 when said winding key is in the wound up position and is in engagement with one of the pins 13 or other stop member provided for a like purpose.

With a structure such as that so far described the release of the alarm movement of the clock causes a movement of the key 10 in a direction to bring the extension 12 of the wing 11 into engagement with the arm 31 and thus move the arm away from the lug 33. The sweep of the wing 11 is such that the spindle 19 is turned through an arc corresponding to the distance between two of the numbers on the face plate 17 of the chamber 16. For instance, if the position of the pointer 21 is such as to indicate 60 on the face plate 17 when the arm 31 is in engagement with the lug 33, the extension 12 moves the arm a distance causing the pointer 21 to move from 60 to 70. Of course, if the device be so constructed that the pointer is initially at 70 then the same movement will cause it to travel from 70 to 80. If the original setting of the pointer be such that it indicates some other temperature and there is the proper relations of the other parts, then the pointer may come to rest, after actuation, at 60. Thus it will be seen that by suitable adjustments of the parts the pointer may be made to stop at any temperature indication desired, the temperatures illustrated on the face plate 17 being by way of example, rather than obligatory.

Mounted on the screw-threaded portion 25 of the spindle 19 is a split block 34 interiorly threaded so as to serve the purpose of a nut, while a clamp screw 35 traversing the split portion of the block serves to hold it firmly yet freely upon the screw threads 25. The block on the side remote from the screw 35 is formed with two spaced parallel arms 36, 37, respectively. The arm 37 has a prolongation in the form of a finger 38 extending to the top of the casing within the latter and at its extremity entering a passage 39 in the casing. This finger 38 serves the purpose of holding the block against rotation with the screw 25, but permits the travel of the block along the screw.

Carried by the arm 36 is a contact terminal 40 insulated from the arm and connected to one end of a conductor 41. The other arm 37 carries a similar contact terminal 42 insulated from the arm and in turn connected to one end of another conductor 43. Intermediate of the two contacts 40 and 42, which are directed one toward the other, is another contact member 44 carried by and extending through a tongue 45 on one end of a thermostatic element 46, the other end of this element being made fast by a screw 47 or otherwise to the interior of the casing 1 near the upper end thereof.

The thermostatic element may be of the usual metal and hard rubber type, or of any other type, whether or not dependent upon differences in expansion of different substances under the action of temperature changes.

Fast to the casing 1, as by a binding screw 48, is another conductor 49. The conductors 41, 43 and 49 are of the usual insulated type, and are together carried through a channel 50 in the ring 4 and finally through a notch 51 in the ring, which notch may be conveniently located at a low point in the ring, so that the conductors do not interfere with the placing of the thermostatic controlling device upon a flat surface. Of course, any other manner of disposing of the conductors may be employed. The three conductors are used one as a common conductor and the other two as individual to the respective contact terminals 40 and 42.

Upon the face of the casing above the wall 17 a thermometer 52 is secured, thus placing it in convenient position for observation whenever desired.

The contact 44 has a range of movement between the contacts 40 and 42 sufficient to always have the contact 44 out of engagement with one of the contacts, say, the contact 40, before engaging the contact 42, or vice versa.

With the thermostat properly adjusted so as to agree with the thermometer on the face of the casing, it may be assumed that the predetermined temperature is 70°. Under these circumstances a slight rise in the temperature will cause a movement of the contact carried by the thermostatic element to bring it into engagement with one or the other of the relatively fixed contacts 40 or 42. For purpose of example let it be assumed that by a rise of temperature the contact 44 is brought into engagement with the contact 40. This will cause in a properly constructed system a turning off of the flow of the heating fluid which may, for instance, be steam or hot water, or gas and the temperature in the room will begin to fall. As soon as the temperature has dropped slightly below 70° the temperature change acting upon the thermostatic element causes it to move in the opposite direction until the contact 44 leaves the contact 40 and engages the contact 42, whereupon the heating fluid is again caused to flow and the room is heated until its temperature again rises to or above 70°, whereupon the first operation is repeated, and so on indefinitely.

Suppose it be desired to provide for the heating up of a dwelling early in the morning, then the alarm side of the clock is set to act at the desired hour. Usually a dwelling is allowed to cool down at night, and this may be caused by moving the hand 21 normally set at 70 to indicate a lower temperature, say, 60. This causes a corresponding movement of the block 34, which so sets the circuit terminals on the block with relation to the terminal on the thermostat as to prevent a rise in temperature above 60° instead of 70°, which latter may be taken as the desirable temperature for day time.

At the proper time the alarm movement is released and the wing 11 in its movement engages the arm 31, thus actuating it to an extent which causes a turning of the spindle 19 sufficiently to bring the finger 21 into pointing relation to the numeral 70, and this at the same time readjusts the thermostatic contacts so that the circuit which causes a turning on of the heating fluid is energized and such fluid is caused to flow until the temperature rises to 70°, whereupon the thermostatic control begins and continues as before.

In order to avoid any liability of the thermostat working to control the temperature when not desired, a manually operable switch 53 is mounted upon a ledge 54 below the chamber 16 and above the clock 5, which ledge also carries the binding post 48.

This binding post 48 is insulated from the ledge and has an exposed end 55 in the path of the switch 53, the latter being electrically connected with the casing. When the switch 53 is in engagement with the end 55 of the binding post 48, the circuit is completed through the casing to the conductor 49 and when the switch is moved from the exposed end 55 the return circuit through the conductor 49 is broken.

In a device of the character of the present invention accuracy of movement demands that lost motion shall be eliminated so far as possible, while in the case of the block 34 a considerable range of movement with but a small fractional turn of the screw 25 is desirable. For this reason the screw 25 is of the multiple thread type; that is, it is provided with two or more parallel threads, thus permitting the use of a long pitch, while at the same time the threads themselves may be relatively fine. This in conjunction with the split block and clamp screw 35 permits a close fit between the nut and screw without binding and a sufficiently large bearing engagement to eliminate liability of lost motion even with a long pitch screw. Because of such construction a fractional turn of the spindle 19, say, a turn of 60° or less, is ample to move the block 34 through a relatively long distance.

Furthermore, the timepiece is firmly held by the long pins 14 and straps 15 presenting large frictional engagement between the pins and straps. The timepiece may be pulled straight away from the ring 4 and replaced in proper relation thereto with little effort, and yet with the assurance that the timepiece will maintain its proper relation to the casing when placed thereon.

The actuating force for moving the adjusting mechanism represented by the block or nut 34 and screw 25 is received wholly from the time device acting through the transmission elements represented by the link 30 and arm 31, while the frictional engagement of the screw 25 and nut 34 is sufficient to hold the parts in any position to which they may be adjusted or moved, and also permitting the manual adjustment of the parts through the head 20.

What is claimed is:—

1. A thermostatic structure, comprising a thermostatic element with supporting means at one end and free at the other end, a carrier with spaced contacts thereon positioned with respect to the thermostatic element to be directly engaged by the free end thereof, a spindle with a long-pitch screw thread thereon threaded through the carrier and constituting the sole support and actuating means for the carrier, a pointer on and movable with the spindle, and a dial over which the pointer is movable.

2. A thermostatic structure, comprising a thermostatic element with a support at one end and free at the other end, a carrier with spaced contacts thereon positioned with respect to the free end of the thermostatic element to be directly engaged thereby, a spindle extending in the same direction as the movements of the free end of the thermostatic element, said spindle having a long-pitch screw thereon threaded through the carrier and constituting the sole support and actuating means therefor, a pointer on and movable with the spindle, and a dial with which the pointer is associated, the pitch of the screw being related to the movement of the thermostatic element under predetermined extremes of temperature to impart to the contacts a corresponding range of movement by a rotative movement of the spindle not exceeding one turn thereof.

3. A thermostatic structure, comprising a suitable support, a thermostatic element fast at one end to the support and free at the other end, a spindle extending from front to rear of the support and mounted for rotation therein, said spindle having a long-pitch screw thereon, a carrier through which the screw is threaded with said carrier supported by the screw and provided with means for preventing rotation of the carrier with the screw, a pointer and manipulating means on one end of the spindle with the pointer adjustably mounted on the spindle, a dial on the casing over which the pointer is movable, a timepiece on the casing, an arm on the end of the spindle remote from the pointer and also adjustably secured thereto, and connections between the timepiece and the arm for the actuation of the spindle by the timepiece.

4. A thermostatic structure comprising a thermostatic element, spaced contacts in the path of and arranged on opposite sides of the thermostatic element, a block with a multi-threaded passage therethrough and provided with spaced arms carrying the contacts, a multi-threaded screw traversing the passage in the block and constituting the sole support for the block, means for rotating the screw to propel the block lengthwise of the screw, and means for holding the block against rotation while being propelled along the screw by the latter.

5. A thermostatic structure comprising a thermostatic element, spaced contacts in the path of and arranged on opposite sides of the thermostatic element, a block with a multi-threaded passage therethrough and provided with spaced arms carrying the contacts, a multi-threaded screw traversing the passage in the block and constituting the support for the block, means for rotating the screw to propel the block lengthwise of the screw, and means for holding the block against rotation while being propelled along the screw by the latter, said block being split lengthwise of the threaded passage and provided with clamping means for regulating the pressure of the block upon the screw.

6. A thermostatic structure comprising a thermostatic element, a block provided with a screw threaded passage therethrough, spaced contacts on and normally fixed to the block, a rotatable screw carrying and constituting the sole support for the block and propelling the latter by rotative movements of the screw to shift the contacts with relation to the thermostatic element, means for rotating he screw, a pointer carried by the screw and provided with means for holding it in adjusted positions about the longitudinal axis of the screw, and an index member in coöperative relation to the pointer.

7. A thermostatic structure comprising a thermostatic element, spaced contacts in the path of said element, a carrying member for and to which the contacts are normally fixed, a screw constituting the sole support for the carrying member and along which it is movable by rotative movements of the screw, and means for imparting rotative movements to the screw including a timepiece for actuating the screw at a predetermined time.

8. A thermostatic structure comprising a thermostatic element, contacts in the path of said element, adjusting mechanism for the contacts, shifting means for the adjusting mechanism, connections between the shifting means and the adjusting mechanism and provided with friction clamping means for varying the relation between the shifting means and adjusting mechanism, a time device for actuating the shifting means, and a pointer carried by the adjusting mechanism and having friction clamp connections thereto, whereby the thermostatic structure may be calibrated and recalibrated at will.

9. A thermostatic structure comprising a thermostatic element, a multi-threaded split block with a clamp screw and with spaced arms provided with contact terminals in the path of the thermostatic element, a multi-threaded screw traversing the threaded block and mounted for rotary movements, a manipulating head connected to the screw, a pointer rotatable with the screw and having a clamp connection therewith for adjustment of the pointer about the longitudinal axis of the screw, an arm on the screw and provided with clamp connections thereto for the adjustment of the arm about the longitudinal axis of the screw, a time device having a power-actuated movable member, and articulated means in the path of the power-actuated movable member and connected to the arm for imparting rotative movement to the screw by the movable member of the time device.

10. A thermostatic structure comprising a casing, a thermostatic element therefor, contact terminals between which the thermostatic element is movable, a carrier for the terminals, a rotatable spindle mounted in the casing and provided with a screw-threaded portion traversing the carrier for imparting movement thereto to adjust the terminals with relation to the thermostatic element, a time device provided with readily removable connections to the casing for the bodily application and removal of the time device, connections between the spindle and the time device for the actuation of the spindle by power stored in the time device, and a switch carried by the casing and interposed in the circuits including the circuit terminals of the thermostatic element.

11. A thermostatic structure comprising a thermostatic element, contacts in the path of said element, a carrier for the contacts in the form of a nut, a rotatable spindle constituting the sole support for the nut and provided with screw threads traversing said nut, means for holding the spindle against longitudinal movement, means for holding the nut against rotative movement and permitting movements of the nut along the spindle, means for moving the spindle about its longitudinal axis, and indicating means on the spindle provided with clamp means in embracing relation to the spindle for the adjustment of the indicating means about about the longitudinal axis of the spindle.

12. A thermostatic structure comprising a thermostatic element, contacts in the path of said element, a carrier for the contacts in the form of a nut, a rotatable spindle constituting the sole support for the nut and provided with screw threads traversing said nut, means for holding the spindle against longitudinal movement, means for holding the nut against rotative movement and permitting movements of the nut along the spindle, means for moving the spindle about its longitudinal axis, and indicating means on the spindle provided with clamp means in embracing relation to the spindle for the adjustment of the indicating means about the longitudinal axis of the spindle, the means for moving the spindle about its longitudinal axis including both manually operable means and automatically operable means.

13. A thermostatic structure comprising a thermostatic element, a split nut with a clamp screw therein and provided with spaced electric contact terminals arranged on opposite sides of the thermostatic element, a screw threaded spindle traversing the nut and constituting the sole supporting means therefor, indicating means on the spindle adjustable about the longitudinal axis of the latter and comprising a pointer with a split collar embracing the spindle and a clamp screw for binding the collar on the spindle, and means for rotating the spindle to cause movements of the nut longitudinally of the spindle.

14. A thermostatic structure comprising a suitable casing, a thermostatic element mounted fixedly therein, a split nut with electric contact terminals arranged on opposite sides of the thermostatic element in the path of the latter, clamping means for the split nut, a rotatable spindle with screw threads traversing the nut and with a manipulating member at one end, journal supports for the spindle for holding the latter against longitudinal movement, means for holding the split nut against rotary movements and permitting its movement along the spindle, a pointer on the spindle having a split sleeve surrounding the latter and a clamp screw for binding the sleeve on the spindle in adjusted positions, and a dial on the casing over which the pointer is movable.

15. A thermostatic structure comprising a suitable casing, a thermostatic element mounted fixedly therein, a split nut with electric contact terminals arranged on opposite sides of the thermostatic element in the path of the latter, clamping means for the split nut, a rotatable spindle with screw threads traversing the nut and with a manipulating member at one end, journal supports for the spindle for holding the latter against longitudinal movement, means for holding the split nut against rotary movements and permitting its movement along the spindle, a pointer on the spindle having a split sleeve surrounding the latter and a clap screw for binding the sleeve on the spindle in adjusted positions, and a dial on the casing over which the pointer is movable, said thermostatic structure having automatic means for imparting rotative movements to the spindle with connections including a split sleeve embracing the spindle and a clamp screw therefor.

In testimony that I claim the foregoing as my own, I have hereto affixed my signature in the presence of two witnesses.

WALTER O. HAYMOND.

Witnesses:
WILLIAM I. HAYMOND,
LILLIAN WEISSE.